Jan. 13, 1925.      1,523,267
F. W. LEONARD
STOCK GUARD
Filed May 7, 1924
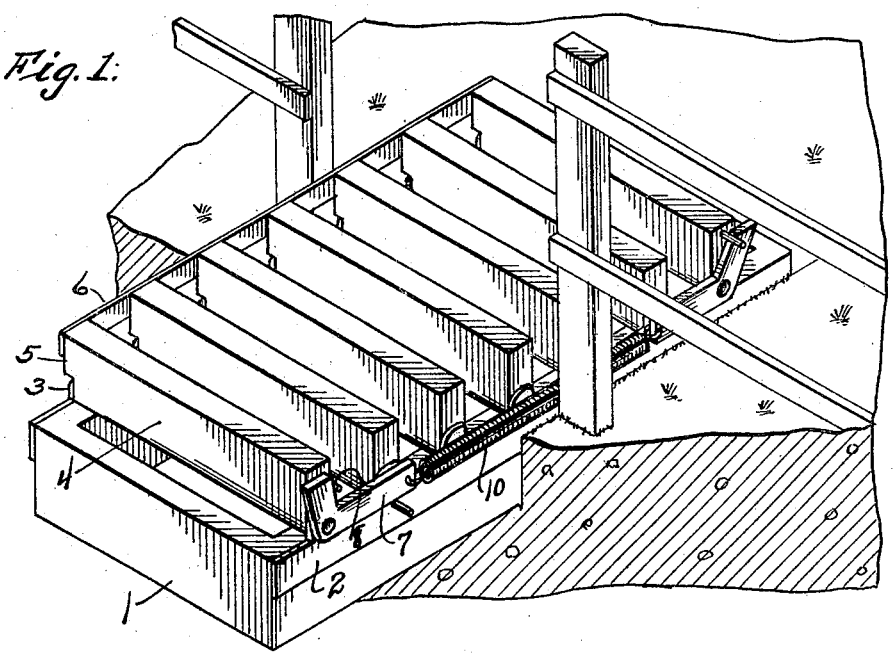
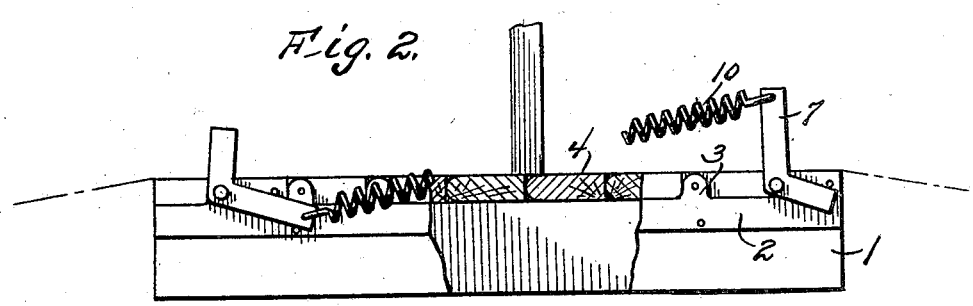
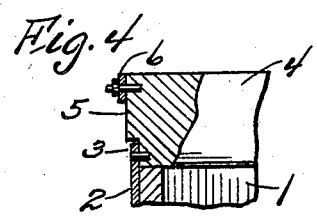
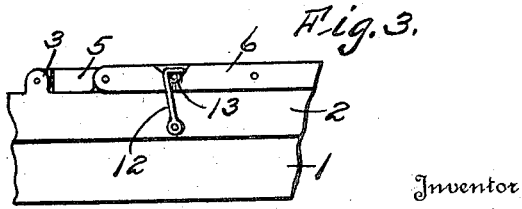
Inventor
F. W. Leonard
WITNESSES
By
Attorney Patented Jan. 13, 1925.

1,523,267

UNITED STATES PATENT OFFICE.

FRANK W. LEONARD, OF BROWNSVILLE, OREGON.

STOCK GUARD.

Application filed May 7, 1924. Serial No. 711,721.

*To all whom it may concern:*

Be it known that I, FRANK W. LEONARD, a citizen of the United States, residing at Brownsville, in the county of Linn and State of Oregon, have invented certain new and useful Improvements in Stock Guards, of which the following is a specification.

The present invention relates to a stock guard and has for its prime object to provide a device which normally prevents the passage of animals thereover which may be operated to allow their passage thereover. The device is designed to take the place of a gate and is constructed so as to be very easily operated by a person and is also capable of being operated by an automobile.

The stock guard embodies a very simple and efficient construction which is reliable in operation, comparatively inexpensive to manufacture and install, durable, strong, and well adapted to the purpose for which it is designed.

With the above and numerous other objects in view as will appear as the description progresses, the invention resides in certain novel features of construction, and in the combination and arrangement of parts as will be hereinafter more fully described and claimed.

In the drawing:

Figure 1 is a perspective view of the device embodying my invention,

Figure 2 is a side elevation thereof partly in section,

Figure 3 is a fragmentary elevation of the other side of the device, and

Figure 4 is a detail section therethrough.

Referring to the drawing in detail it will be seen that 1 designates the base which is in the form of a rectangular frame having bars 2 arranged along its sides adjacent its upper edge. These bars 2 are provided with upwardly extending ears 3. A plurality of slats 4 are pivoted between the ears 3 so that they may be disposed in spaced parallel relation as shown in Figure 1 or coplanar as shown in Figure 2. When disposed as shown in Figure 1 it will be seen that cattle cannot pass over the guard whereas when positioned as shown in Figure 2 the cattle may readily pass thereover as the device is then similar to an ordinary bridge. The outer portion of the ends 5 of slats 4 project slightly and are pivotally attached to a connecting rod 6 so that all of the slats are movable in unison with each other. Thus by actuating one of the end slats to a horizontal position all the other slats will be moved likewise. It is desirable that these slats 4 be maintained in a vertical position and the following mechanism is provided for that purpose.

Two L-shaped levers 7 are pivoted on two of the lips 3 of the bar 2 on the side of the base opposite the connecting rod side so that the shorter ends thereof are adapted to engage pins 8 projecting from two adjacent slats 4, preferably the end slats. The longer portions of these levers 7 are disposed toward each other and a coil spring 10 is attached to the ends thereof for normally holding the longer portions of the levers substantially horizontal as shown in Figure 1 and thus holding the slats 4 in vertical position. Now if one of the end slats 4 is moved to the horizontal position, for example in Figure 1 supposing one of the end slats to the left is swung to the right. This will cause all of the other slats to be swung to the right until they reach a horizontal position. It will therefore be seen that the pin on the end slat to the right will engage the shorter portion of the lever 7 to the right thus fulcruming the same to the position shown in Figure 2 and stretching spring 10 so that whenever the slats are released they will immediately move back to their normal vertical position.

If it is desired to maintain the slats in a horizontal closed position this is accomplished by providing a pivoted hook 12 as is shown in Figure 3 for engaging a suitable pin 13 provided on the connecting rod 6 when the slats are closed or horizontally disposed.

It is thought that the construction and operation of the invention will now be clearly understood without any more detail description thereof. While the preferred embodiments of my invention have been described in detail, it will be understood that I do not wish to be limited to the particular construction set forth, since various changes in the form, material, proportions, and arrangement of parts, and in the details of construction may be resorted to without departing from the spirit and scope of the invention, or destroying any of the advantages contained in the same, heretofore described and hereinafter claimed.

Having thus described my invention, what I claim as new is:

1. In a stock guard of the class described, a base, a plurality of slats pivoted on the base, means for connecting the slats so that they may be swung in unison with each other either to a vertical or horizontal position, pins projecting from the ends of a pair of the slats, a pair of L-shaped levers pivoted on the base and having portions thereof engageable with the pins, and a spring connecting adjacent ends of the levers for normally holding the slats in a vertical position and returning them to a vertical position when forced to a horizontal position.

2. In a stock guard of the class described, a base in the form of a rectangular frame, bars disposed along the sides of the frame and provided with upwardly extending and longitudinally spaced ears, slats, one pivoted between each pair of oppositely disposed ears so that said slats may be swung to either a vertical or horizontal position, a rod connecting the slats so that they will move in unison with each other, a pair of levers pivoted on the base, pins projecting from a pair of said slats and engageable with the portions of the levers, and a spring connecting the levers so as to maintain the slats in a normal vertical position and to return them to vertical position when horizontally disposed.

In testimony whereof I affix my signature in presence of two witnesses.

FRANK W. LEONARD.

Witnesses:
JOSEPH A. JAMES,
AUBREY S. TUSSING.